INVENTOR.
ELBERT A. NEWHOUSE

United States Patent Office 2,837,958
Patented June 10, 1958

2,837,958
STROBOSCOPIC ILLUMINATING SYSTEM FOR VIEWING INSTRUMENTS AND THE LIKE

Elbert A. Newhouse, Indianapolis, Ind.

Application May 13, 1955, Serial No. 508,337

2 Claims. (Cl. 88—2.3)

(Granted under Title 35, U. S. Code (1952), sec. 266)

The invention described herein may be manufactured and used by or for the Government of the United States of America for governmental purposes without the payment of any royalties thereon or therefor.

This invention relates to illuminating means for instruments, sight units, and the like, and more particularly to a stroboscopic illuminating system for instruments, including sight units, and the like, which are in environments of mechanical vibrations.

Conditions often exist wherein instruments or other devices may be observed or used for sighting which are in environments of mechanical vibrations. Under these conditions it is extremely difficult, if not impossible, to obtain accurate readings of the instruments or to make accurate sights through the instruments since the sight patterns of the instruments will become blurred under the influence of the mechanical vibration. Such environment of vibration in extreme cases, as in air-craft, on shipboard, or the like, where large guns are firing sometimes make it substantially impossible to use such instruments as the result of the blurred sight patterns at the precise times when they are most needed.

In the present invention the illuminating means of instruments to be observed is a fast operating glow tube as a neon bulb or, as is preferred, a stroboscopic light. The stroboscopic light source is energized from a stroboscopic light generator which is under the control of a vibration sensing unit placed in contact with the instrument to convert mechanical vibrations into electrical pulses operative to interrupt the energy of the stroboscopic light in direct correspondence to the frequency of the vibrations. In this manner the instrument indicia and indicator or the sight pattern of the sight unit will appear stable so that accurate readings of the observed data may be accomplished. By the use of this system it matters not whether the vibration frequencies are constant or random since the light source will produce illumination at frequencies detected by the vibration pick-up means. Under some conditions where vibrations are produced at a relatively constant frequency, as by the operation of an internal combustion engine or the like, the frequency of vibration may be detected from the ignition system of the engine to produce an interruption of the stroboscopic generator upon the contact of any one ignition conductor. It is therefore a general object of this invention to provide an illuminating system for instruments including sight units, and the like, in mechanical vibrational environments and to stroboscopically illuminate these devices at a frequency of the mechanical vibrations.

These and other objects, advantages, features, and uses will become more apparent as the description proceeds when considered along with the accompanying drawing in which.

Figure 1:
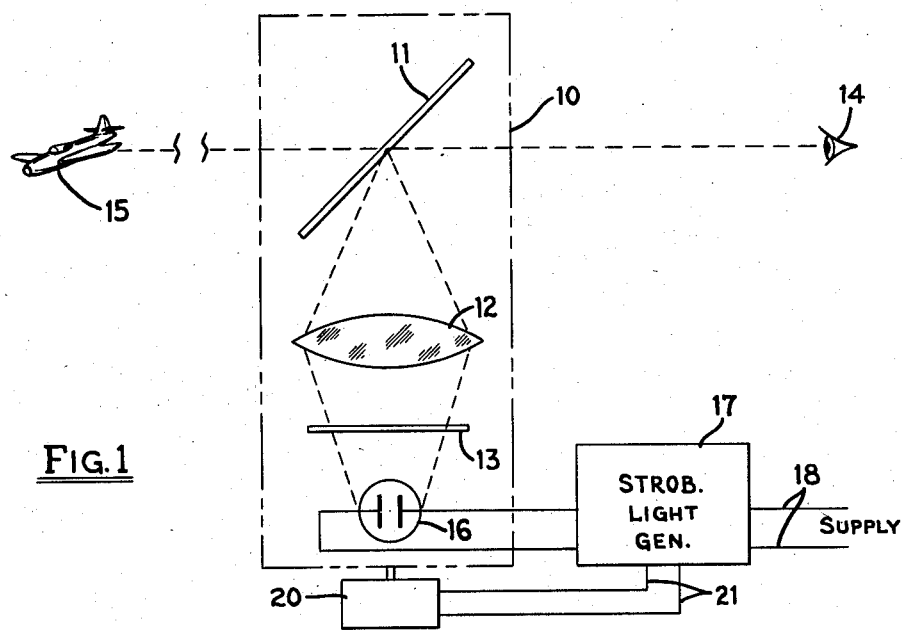
Fig. 1 illustrates the novel illuminating system in use with a sight unit.

Referring more particularly to Fig. 1 there is illustrated a sight unit, enclosed in interrupted lines and referred to generally by the reference character 10, which includes the usual partial reflector plate 11, a condenser lens 12, and a reticle 13. A light source under the reticle produces a reticle image on the partial reflector plate 11 through which an observer positioned at 14 may look to see a target 15. The illuminating source in accordance with this invention is a fast-acting glow tube 16, as a neon tube, but preferably is a stroboscopic light tube commercially well known, which is coupled to a stroboscopic light generator 17 of any well known type that may be in the nature of an electronic relay, or the like. The voltage supply to the stroboscopic light generator 17 comes by way of the supply leads 18. A vibration sensing device 20, of any well known and suitable type for converting mechanical vibrations into electrical pulses, is positioned in contact with the sight unit body 10 at any point to receive the mechanical vibrations present in the sight unit. The output electrical pulse leads 21 are coupled to the stroboscopic light generator 17 in any manner well known in the art to trigger the generator in accordance with the pulses received to cause interruptions of the energy to the stroboscopic light 16. The stroboscopic light 16 being interrupted at the exact frequency of the vibrations picked up by the device 20 will cause a presentation of the reticle 13 on the partial plate 11 at the exact point in every vibration cycle which will cause the reticle image to appear stable and clear to the observer at 14. Accurate sight can therefore be accomplished of any target 15 for information in the control of armament, or the like. Any change in frequency of the mechanical vibrations picked up by the device 20, including random frequency changes, will immediately be effected to control the stroboscopic light 16 whereby the reticle image on the partial plate 11 will remain stable. While the device 20 is herein illustrated as being in contact to pick up vibrations from the sight unit 10 only, it is to be understood that this device 20 may also be positioned to pick up vibrations of the support for the observer at 14 as well. In this manner observation through the sight unit 10 can be accomplished clearly and accurately although many mechanical vibrations exist to disturb the line of sight.

Figure 2:
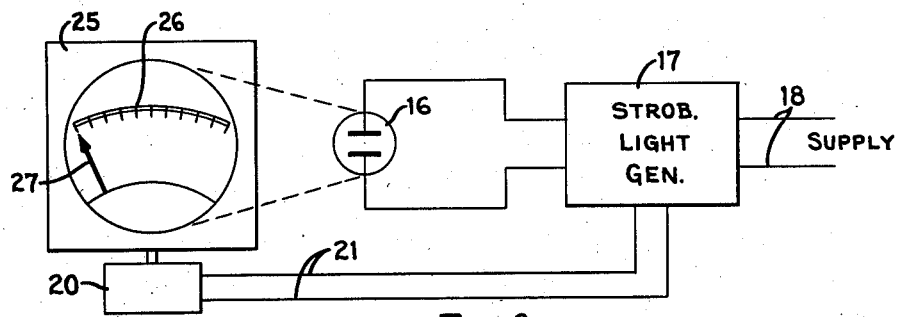
Fig. 2 illustrates the illuminating system as used with an indicating instrument.

Referring more particularly to Fig. 2 wherein like reference characters represent like parts the illuminating system 16 to 21, inclusive, is shown used with an instrument of general application illustrated herein generally by the reference character 25 on which indicia 26 and an indicator 27 are present. The stroboscopic light 16 is positioned, and may be hooded in a manner well understood in the art, to illuminate the indicia 26 and indicator 27. The vibration pick-up device 20 is placed in contact with the instrument case so that any vibrations present in the instrument 25 will be operative to control the stroboscopic light 16 in order that the indicia 26 and indicator 27 will appear stable for accurate reading. As shown in Fig. 1 the instrument 25 may be read under conditions of steady vibration or random vibration. It is to be understood that the pulses received via the conductors 21 from the vibration pick-up device 20 may have an amplifier means therein or the amplifier may be incorporated in the stroboscopic light generator, as is well understood in the art.

Figure 3:
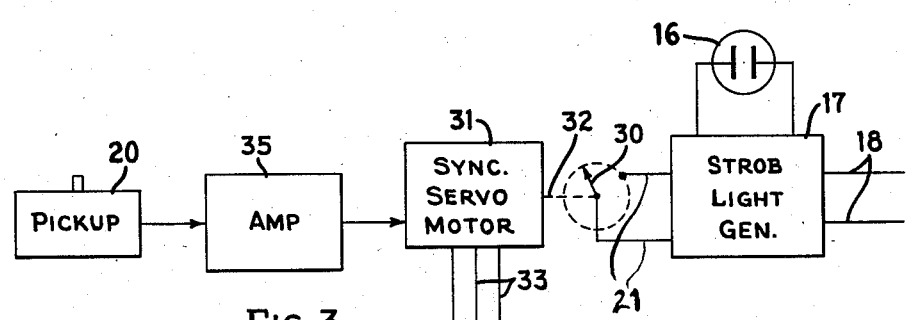
Fig. 3 illustrates a modification of the illuminating system utilizing a synchronous motor driven switch.

Referring particularly to Fig. 3 where like parts have like reference characters with those of Figs. 1 and 2, a stroboscopic light may be positioned on any device to be observed as herein illustrated in Figs. 1 and 2 with energy supplied by the stroboscopic light generator 17 as hereinbefore described. In this modification the stroboscopic light generator may have the energy to the stroboscopic light 16 interrupted by a rotatable contact switch 30 driven by a synchronous servo-motor 31 through the shaft 32 in a manner well understood in the art. The synchronous servo-motor 31 has its field windings energized from a source entering at 33 in the usual manner. The synchronous servo-motor 31 will be driven by signals on its rotor coming from the vibration pick-up device 20 through an amplifier 35. The frequency of the mechanical vibrations picked up by the device 20 will thereby be amplified in the amplifier 35 to cause the self-synchronous motor to drive in synchronism with those mechanical vibrations. The stroboscopic light source 16 will thereby be energized in direct correspondence with the mechanical vibrations picked up by the pick-up device 20, it being understood that the pick-up device 20 will be in contact with the body of the instrument or other device to be observed, which device is illuminated by the stroboscopic light source 16. The observed device will thereby appear stable for observation in the same manner as those devices illustrated in Figs. 1 and 2. This modification utilizing the synchronous servo-motor will not respond as quickly as the illuminated systems shown and described in Figs. 1 and 2, therefore this system will not be used for higher vibrational frequencies.

Where observable instruments are in vibrational environments caused by reciprocating-type engines, the two leads 21 may be coupled across an ignition-type distributor to obtain the cycle of vibration desired. This means of connecting the stroboscopic light source will produce interruptions in the stroboscopic light 16 in the same manner as described for Fig. 3.

While many modifications and changes may be made in the constructional details and features of this invention it is to be understood that I desire to be limited only by the scope of the appended claims.

I claim:

1. An illuminating means for stabilizing light patterns of sight units under conditions of vibration comprising, a sight unit having a partial reflector plate through which a line of sight is established from a point of observation, a reticle, a fast-acting light source enclosed within said sight unit for producing intermittently an image of said reticle on said reflector plate, an electrical source of energy for energizing said light source, and means responsive to mechanical vibrations of said sight unit and said point of observation for transforming mechanical vibrations into electrical signals, said means being electrically coupled to said electrical source for triggering said electrical source whereby said light source is illuminated in cycles corresponding to the mechanical vibrations to stabilize the reticle image on said reflector plate.

2. An optical sight unit for viewing a target comprising, a partial reflector plate attached to a sight unit body, a reticle mounted within said body, a fast-acting light enclosed within said body for producing intermittently an image of said reticle on said partial reflector plate, a source of power for said light, and vibration pickup means connected to said sight unit body for producing electrical signals responsive to the frequency of vibration of said sight unit, said electrical signals being coupled with said source of power for intermittently triggering said source of power whereby said reticle pattern is produced on said reflector plate at cycles corresponding to the frequency of vibration of said sight unit body.

References Cited in the file of this patent
UNITED STATES PATENTS

| | | |
|---|---|---|
| 2,432,730 | Davey | Dec. 16, 1947 |
| 2,449,651 | Hathaway | Sept. 21, 1948 |
| 2,458,831 | Cady | Jan. 11, 1949 |
| 2,521,141 | Allen | Sept. 5, 1950 |

FOREIGN PATENTS

| | | |
|---|---|---|
| 464,076 | Canada | Mar. 28, 1950 |